June 7, 1932.  E. PROCTER  1,861,719
BAKER'S OVEN AND THE LIKE
Filed Oct. 25, 1928  2 Sheets-Sheet 1

Patented June 7, 1932

1,861,719

UNITED STATES PATENT OFFICE

EDWARD PROCTER, OF LONDON, ENGLAND

BAKER'S OVEN AND THE LIKE

Application filed October 25, 1928, Serial No. 315,080, and in Great Britain November 14, 1927.

This invention relates primarily to bakers' ovens but is applicable also to ovens for other like purposes.

The object of the present invention is to provide an improved form of oven which will have all the advantages of both the conveyor and draw-plate types of oven hitherto adopted without their attendant disadvantages, the chief of which are, for the conveyor type, the necessity for a very large floor space for a given output and for constant attention of one or more operators to the continuous conveyor; and, for the draw-plate type, a limited output, the expenditure of a considerable amount of energy in moving the drawplate into and out of the oven and the abstraction of a large amount of heat from the oven and its transference to the bakehouse each time that the draw-plate is withdrawn resulting in a high temperature in the bakehouse.

The invention consists in an oven comprising a conveyor carrying a plurality of plates or trays, trunnioned or pivoted thereon, so that the conveyor may follow any convenient path through the oven while the plates or trays will maintain a substantially horizontal position.

The invention also consists in an oven according to the preceding paragraph in which the trays or plates are arranged in separate groups upon the conveyor which is movable through the oven intermittently so that there will always be at least one group of plates outside the oven at a convenient height for loading and unloading.

The invention also consists in an oven of the above character in which guides are provided to prevent any tendency to displacement of the trays or plates.

The invention further consists in an oven of the above character in which means are provided for automatically controlling the oven doors as required consequent upon movement of the conveyor.

The invention also consists in an oven of the above character in which the conveyor is so arranged that it encircles a central space in which one or more "pell" ovens (operated from either side of the main oven) may be situated.

The invention still further comprises other details hereinafter described or indicated.

The accompanying drawings illustrate more or less diagrammatically one convenient arrangement of bakers' oven in accordance with the invention.

Figure 1:
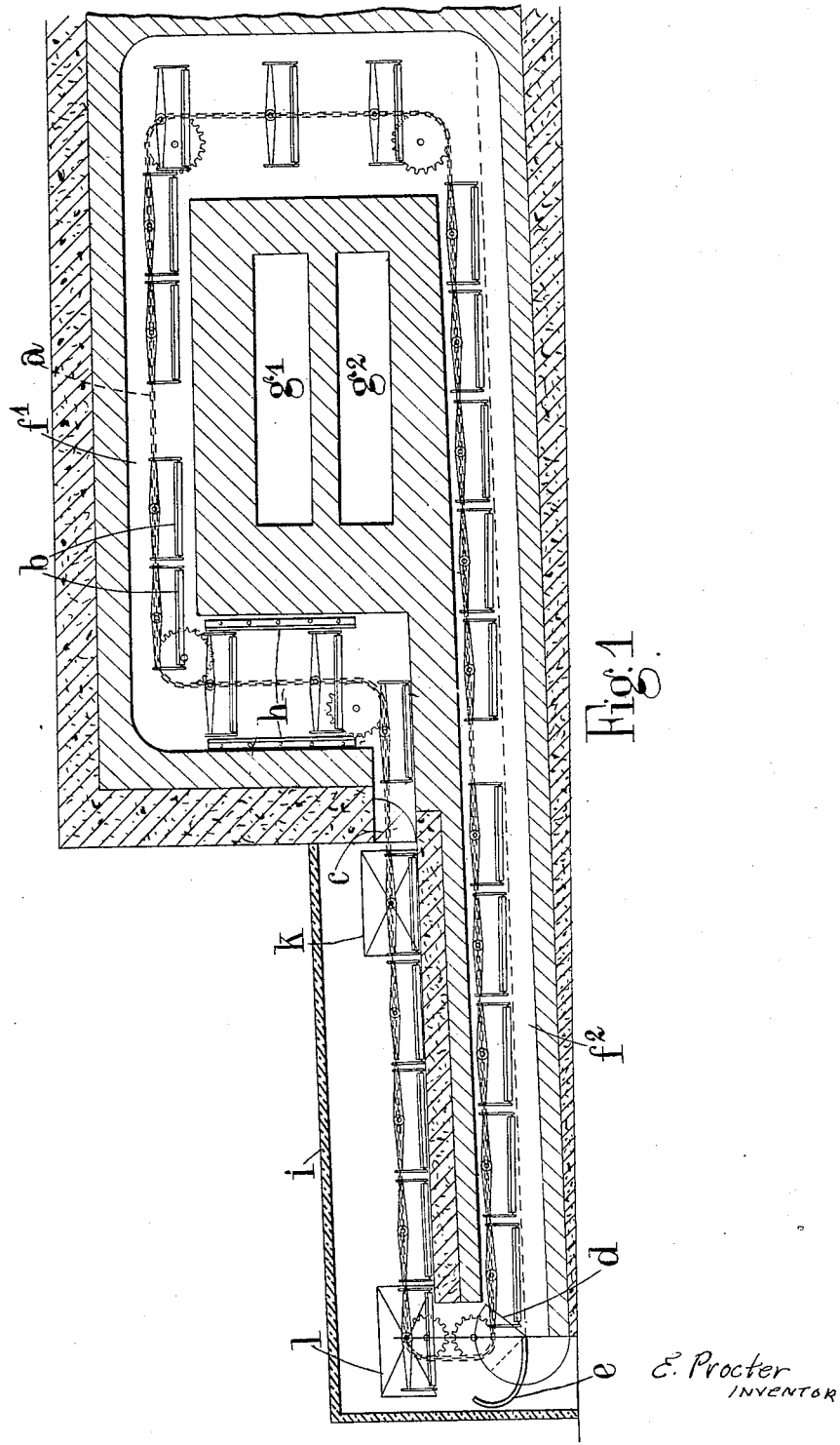
Figure 1 is a sectional elevation of a form of oven in accordance with the invention.
Figure 2:
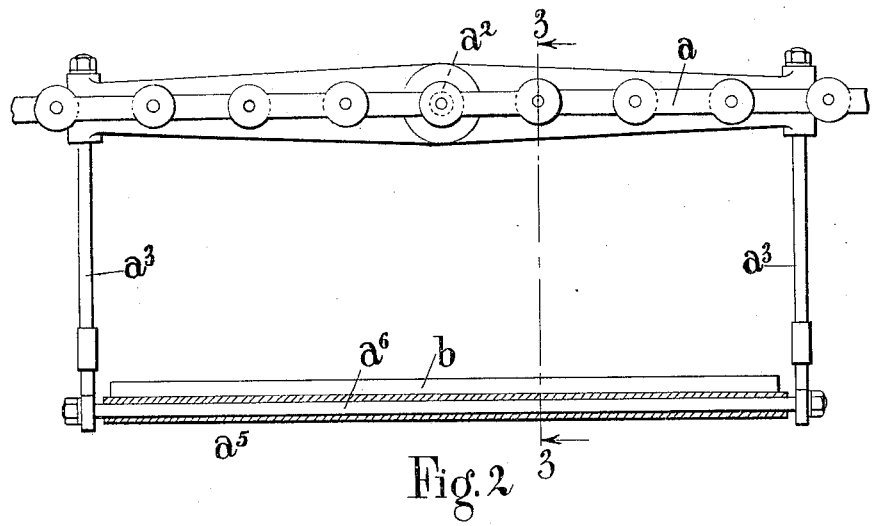
Figure 2 is an enlarged view of a part shown in Figure 1.
Figure 3:
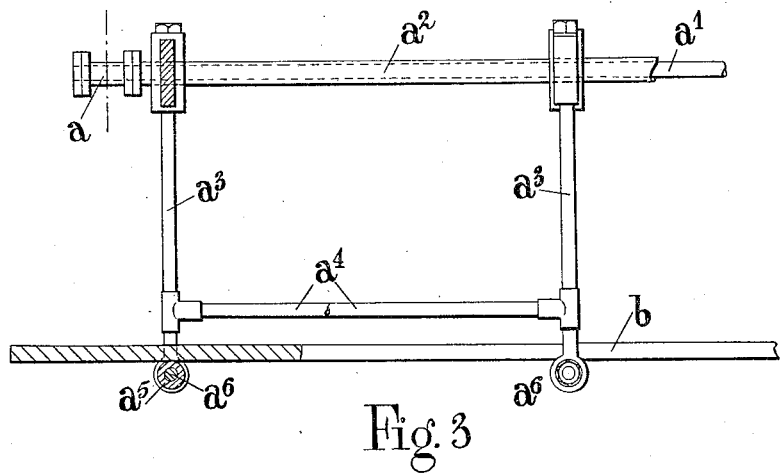
Figure 3 is a section on the line 3—3 of Figure 2.

In carrying my invention into effect in one convenient manner when producing an oven suitable for the baking of bread, biscuits or the like, I form my oven chamber of brickwork, concrete, metal with insulating lagging or packing or of other suitable material and of any convenient size and shape.

The oven may be adapted to be heated by steam tubes, gas, high pressure hot water, electricity, combustion gases produced by the burning of coal or coke in a furnace and passing along flues suitably placed in the walls, floors and/or roofs of the ovens or by any other suitable means.

The oven is also provided with a conveyor which in the example illustrated consists of two endless chains (one of which is shown at $a$) guided in their motion through the oven by being passed round pulleys, sprockets or like means and arranged to be driven from an electric motor or from any other suitable prime mover (not shown) the conveyor chains or like flexible members having trunnioned or pivoted thereon at intervals groups of plates $b$, trays, or the like adapted to be loaded with dough or other material to be baked, the trays or plates being formed of cast iron or other suitable material and being suspended from the pivots or trunnions of the conveyor chain by suitable links framing or other structure.

Thus, in the example shown the chains are connected at suitable intervals by cross bars $a^1$ on which are pivoted sleeves $a^2$ to which are secured hangers $a^3$ cross braced as at $a^4$ and carrying rollers $a^5$ onto and from which the trays $b$ may be slid, the rollers $a^5$ being supported on longitudinal ties $a^6$.

It is intended that the conveyor shall be operated intermittently and suitable means may be adopted for controlling the intermittent movement as also for controlling the opening and closing of the two doors $c$ $d$ with which the oven is provided and through which the conveyor obtains ingress into and egress from the oven respectively.

Assuming, for example, that the whole baking operation occupies a period of fifty minutes I might provide the conveyor with five groups of plates or trays separated from one another at intervals and there would be four movements of the conveyor, each movement occupying a very short space of time and the conveyor occupying its various positions of rest for four periods of substantially $12\frac{1}{2}$ minutes each.

On commencing operations the group of trays or plates outside the oven (that is, the upper left-hand group of five trays shown in the drawings) would be loaded and the movement of the conveyor would take such group of plates through the oven inlet door $c$ and into the hottest part of the oven where the dough would be subjected to the requisite heat for a period of $12\frac{1}{2}$ minutes. In the meantime the next preceding group of trays or plates on the conveyor (that is, the lower left-hand group shown on the drawings) would have emerged from the oven through the door $d$ and may be duly loaded and so on until the whole of the groups have been loaded, the dough or the like being meanwhile subjected to a gradually falling temperature in the oven and at the end of the 50 minutes' period that group which was first loaded would emerge from the oven with the bread or the like thereon properly baked and at the outlet end of the oven I may provide guide rails $e$ or other means for automatically tipping the plates as they emerge in order that their contents may be deposited upon a travelling belt conveyor or otherwise suitably dealt with.

It is to be understood, however, that the above periods and numbers of groups of trays are given purely by way of example since obviously these details would be varied in accordance with any particular requirements.

In the particular construction illustrated the main part $f'$ of the oven may be of considerable height in relation to a forward extension $f^2$ of the oven forming a kind of platform to support the plates or trays to be loaded and in the larger portion of the oven the conveyor would then be made to travel round and as it were enclose a central portion which may be utilized for the construction of one or more "peel" ovens (such as $g1$ $g^2$) which may be fed and worked from the side of the oven thus giving a considerably increased output of the oven installation for a given floor space and conserving and utilizing to the best advantage the available heat.

Owing to the fact that the conveyor is operated intermittently it follows that the doors $c$ $d$ of the oven are open only at the moments when the conveyor is required to be moved one section so that in this way also there is a considerable conservation of heat as compared with ordinary continuous conveyor ovens in which the doors are required to be always open.

Furthermore, the actual working time of the conveyor is reduced to a minimum so that the actual wear and tear on the conveyor is correspondingly reduced and there is considerable economy obtainable in the working of the oven owing to the limited amount of power that is absorbed in its operation.

Where necessary or desirable the interior of the oven may be furnished with guide rails (such as $h$) or other means designed to check any tendency for the trays or plates to become displaced.

In some cases I may provide an insulated cover or enclosure such as $i$ for the purpose of minimizing any loss of heat from the conveyor section outside the oven to the bakery in which case the trays could be loaded and unloaded individually by the opening of the swing or other doors $k$ $l$ arranged at the side of such enclosure and in this case the intermittent movement of the conveyor would be controlled to permit of such loading and unloading operations.

It will be understood, however, that the invention is not to be limited to the foregoing details of construction which are given purely by way of illustration to indicate the nature of the invention and I may vary the size and form of oven, the materials from which the same is formed, the means adopted for securing the necessary heating for the main oven and for any supplementary ovens that may be enclosed therein, the number and grouping of the plates or trays, the construction of the conveyor and the means adopted for operating the same depending upon the purpose for which the oven is to be employed or any practical requirements that may have to be fulfilled.

Having now described my invention, what I claim as new and desire to secure by Letters Patent is:—

1. A baker's oven comprising a structure having a main part and a lateral extension thereof with an inlet doorway to the main part and an outlet doorway from the extension, a flexible conveyor carrying a plurality of trays arranged thereon in separate groups said main part and lateral extension enclosing all of the conveyor with the exception of a portion corresponding in length to that occupied by a group of trays whereby one group may always be disposed outside the oven between the outlet and inlet doorways while the other groups are disposed within the oven and said extension, and means for intermittently moving the conveyor whereby at each movement the newly loaded group of trays is caused to enter the oven and the group of trays within the extension is caused to take the place of the last mentioned group.

2. A baker's oven as claimed in claim 1, having a peel oven arranged centrally within the main part of the oven and spaced from the walls thereof and having its bottom forming a continuation of the upper wall of the extension and the conveyor is caused to travel in a circuituous path through the main part about the peel oven and through the lateral extension of the oven as well as over the top wall of the extension and outside the oven.

3. A baker's oven as claimed in claim 1, characterized in that the lateral extension and inlet and outlet doorways are all located at one side of the main part of the oven.

In testimony whereof I have signed my name to this specification.

EDWARD PROCTER.